(12) United States Patent
Xie et al.

(10) Patent No.: US 10,108,039 B2
(45) Date of Patent: Oct. 23, 2018

(54) TOUCH ARRAY SUBSTRATE, LIQUID CRYSTAL DISPLAY PANEL AND LIQUID CRYSTAL DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Huimin Xie, Xiamen (CN); Xiufeng Zhou, Xiamen (CN); Tao Peng, Xiamen (CN); Zhaodong Zhang, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/954,542

(22) Filed: Apr. 16, 2018

(65) Prior Publication Data

US 2018/0231819 A1     Aug. 16, 2018

Related U.S. Application Data

(63) Continuation-in-part of application No. 15/003,570, filed on Jan. 21, 2016, now Pat. No. 9,965,087.

(30) Foreign Application Priority Data

May 8, 2015   (CN) .......................... 2015 1 0232585

(51) Int. Cl.
   *G02F 1/1333*   (2006.01)
   *G06F 3/041*    (2006.01)
   (Continued)

(52) U.S. Cl.
   CPC .... *G02F 1/13338* (2013.01); *G02F 1/133514* (2013.01); *G06F 3/044* (2013.01);
   (Continued)

(58) Field of Classification Search
   CPC ............... G02F 1/13338; G02F 1/1343; G02F 1/134309; G06F 3/0416; G06F 3/0412; G06F 2203/04103; G06F 3/044
   See application file for complete search history.

(56) References Cited

U.S. PATENT DOCUMENTS 9,652,075 B2     5/2017  Nakanishi et al.
2010/0007837 A1*  1/2010  Ham ................ G02F 1/134309
                                                        349/139
(Continued)

FOREIGN PATENT DOCUMENTS

CN     101512469 A    8/2009
CN     103293785 A    9/2013
(Continued)

*Primary Examiner* — Jia Pan
(74) *Attorney, Agent, or Firm* — Faegre Baker Daniels LLP

(57) ABSTRACT

A touch array substrate includes a substrate and a touch sensing electrode layer including a plurality of touch sensing electrodes; a touch sensing electrode line layer includes a plurality of touch sensing electrode lines and a plurality of virtual touch sensing electrode lines; each of the touch sensing electrodes is electrically connected with at least one of the touch sensing electrode lines; at least one of the touch sensing electrodes includes a first slot and a second slot; a third region which represents a projection of the second slot on the substrate is separated from a projection of each of the touch sensing electrode lines, and the third region is at least partially overlapped with a projection of the respective one of the virtual touch sensing electrode lines on the substrate.

12 Claims, 18 Drawing Sheets

(51) Int. Cl.
*G02F 1/1343* (2006.01)
*G06F 3/044* (2006.01)
*G02F 1/1335* (2006.01)

(52) U.S. Cl.
CPC ...... G06F 3/0412 (2013.01); *G02F 1/134309* (2013.01); *G02F 2201/121* (2013.01); *G02F 2201/123* (2013.01); *G06F 3/0416* (2013.01)

(56) References Cited

U.S. PATENT DOCUMENTS

| | | |
|---|---|---|
| 2012/0033168 A1 | 2/2012 | Hwang et al. |
| 2013/0162570 A1* | 6/2013 | Shin ................ G06F 3/041 345/173 |
| 2013/0257794 A1* | 10/2013 | Lee ................ G06F 3/041 345/174 |
| 2015/0309634 A1* | 10/2015 | Lee ................ G06F 3/0412 345/173 |
| 2016/0253023 A1* | 9/2016 | Aoyama ........... G06F 3/0416 345/174 |
| 2016/0259445 A1 | 9/2016 | Yang et al. |
| 2017/0177132 A1 | 6/2017 | Ishizaki et al. |

FOREIGN PATENT DOCUMENTS

| | | |
|---|---|---|
| CN | 103323988 A | 9/2013 |
| CN | 203535592 U | 4/2014 |
| CN | 104022128 A | 9/2014 |
| CN | 104461154 A | 3/2015 |
| TW | 201250562 A | 12/2012 |

\* cited by examiner

TOUCH ARRAY SUBSTRATE, LIQUID CRYSTAL DISPLAY PANEL AND LIQUID CRYSTAL DISPLAY DEVICE

CROSS-REFERENCE TO RELATED APPLICATION

This application is a continuation-in-part of U.S. application Ser. No. 15/003,570, filed Jan. 21, 2016, which claims priority to Chinese Application No. 201510232585.4, filed May 8, 2015, which are herein incorporated by reference in their entirety.

TECHNICAL FIELD

The present disclosure relates to the field of display technologies and, in particular, to a touch array substrate, liquid crystal display panel, and liquid crystal display device.

BACKGROUND

Due to their advantages such as good portability and low power consumption, Liquid Crystal Displays (LCDs) have been widely used in various display devices such as smartphones, notebooks and monitors.

SUMMARY

In order to decrease the load between the touch sensing electrode line and the touch sensing electrode, the present disclosure provides a touch array substrate, including: a substrate; a touch sensing electrode layer including a plurality of touch sensing electrodes insulated from each other, and a touch sensing electrode line layer including a plurality of touch sensing electrode lines and a plurality of virtual touch sensing electrode lines. Projections of the plurality of touch sensing electrode lines on the substrate in a direction perpendicular to the substrate are separated from projections of the plurality of virtual touch sensing electrode lines on the substrate in the direction perpendicular to the substrate. Each of the plurality of touch sensing electrodes is electrically connected with at least one of the plurality of touch sensing electrode lines. At least one of the plurality of the touch sensing electrodes includes a first slot and a second slot. A first region, which represents a projection of the first slot on the substrate in the direction perpendicular to the substrate, is at least partially overlapped with a second region which represents a projection of the respective one of the plurality of touch sensing electrode lines on the substrate in the direction perpendicular to the substrate. A third region which represents a projection of the second slot on the substrate in the direction perpendicular to the substrate is separated from a projection of each of the plurality of touch sensing electrode lines on the substrate in the direction perpendicular to the substrate. And the third region is at least partially overlapped with a projection of a respective one of the plurality of virtual touch sensing electrode lines on the substrate in the direction perpendicular to the substrate.

The disclosure provides a liquid crystal display panel, including a color filter substrate, the touch array substrate disposed opposite to the color filter substrate and a liquid crystal layer disposed between the color filter substrate and the array substrate.

The disclosure provides a liquid crystal display device, including the liquid crystal display panel according to any of the embodiments of the disclosure.

In the touch array substrate provided by the disclosure, a projection of the first slot in the touch sensing electrode onto the substrate in a direction perpendicular to the substrate is at least partially overlapped with that of the touch sensing electrode line onto the substrate in the direction perpendicular to the substrate so as to reduce the surface area of a portion of the touch sensing electrode overlapped with the touch sensing electrode line, thereby decreasing the parasitic capacitance between the touch sensing electrode line and the touch sensing electrode proportional to the area of the touch sensing electrode line that faces the touch sensing electrode and further reducing a load between the touch sensing electrode line and the touch sensing electrode.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

In order to more clearly illustrate the technical solutions of embodiments of the disclosure, the drawings used for the description of the embodiments are briefly introduced below. Obviously, the drawings for the following description only show some embodiments of the disclosure, and other drawings may be obtained from the described drawings.

Figure 1:
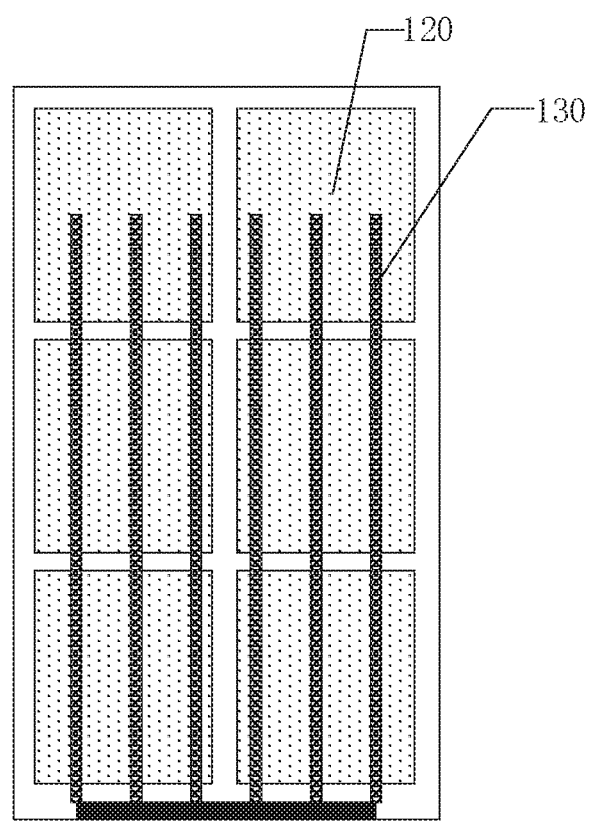
FIG. 1 is a schematic top view of an array substrate in a self-capacitive in-cell touch panel.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

In order to make the objects, technical solutions and advantages of the disclosure more clear, the technical solutions of the disclosure are clearly and completely described below with reference to the accompanying drawings in combination with the embodiments of the disclosure. Obviously, merely some instead of all embodiments of the disclosure are described herein. Other embodiments obtained in light of the described embodiments of the disclosure should fall within the scope of the disclosure.

FIG. 1 is a schematic top view of an array substrate in a self-capacitive in-cell touch panel. As shown in FIG. 1, the touch array substrate includes a plurality of touch sensing electrodes 120 insulated from each other and configured for sensing a user touch and the touch array substrate includes a plurality of touch sensing electrode lines 130. Each of the touch sensing electrode lines 130 is electrically connected with a corresponding one of the touch sensing electrodes 120 and is configured to apply an electric driving signal to the touch sensing electrode 120 so that the position of the user touch can be sensed by the touch sensing electrodes 120.

It was found in the touch array substrate that a parasitic capacitance is formed between the touch sensing electrode line 130 that is not electrically connected with the touch sensing electrode 120 disposed opposite to the touch sensing electrode line 130 and the touch sensing electrode 120, causing an increased load of the touch sensing electrode line 130.

In order to decrease the load between the touch sensing electrode line and the touch sensing electrode, the disclosure provides a touch array substrate.

Figure 2A:
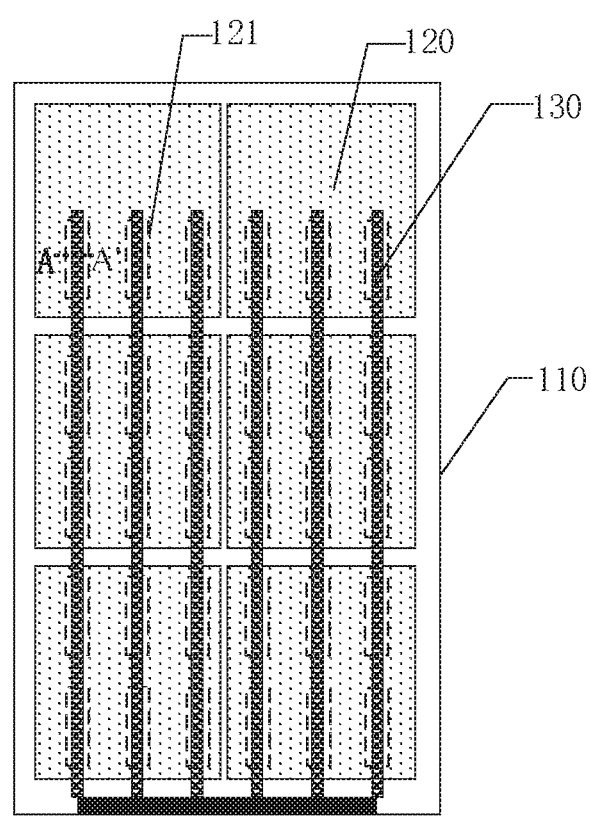
FIG. 2A is a schematic partial top view of a touch array substrate, according to embodiments of the disclosure.

FIG. 2A is a schematic partial top view of a touch array substrate, according to embodiments of the disclosure. As shown in FIG. 2A, the touch array substrate of the disclosure includes: a substrate 110; and a touch sensing electrode layer, including a plurality of touch sensing electrodes 120 insulated from each other, each of which is electrically connected with one touch sensing electrode line 130.

Herein, the touch array substrate may be a substrate comprised of a thin film transistor (TFT) array, where the TFT is used as a switch element. The TFT, which includes a gate electrode, a semiconductor layer, a source electrode and a drain electrode, may be of a bottom-gate configuration in which the gate electrode is below the semiconductor layer, or alternatively may be of a top-gate configuration in which the gate electrode is above the semiconductor layer.

Figure 2B:
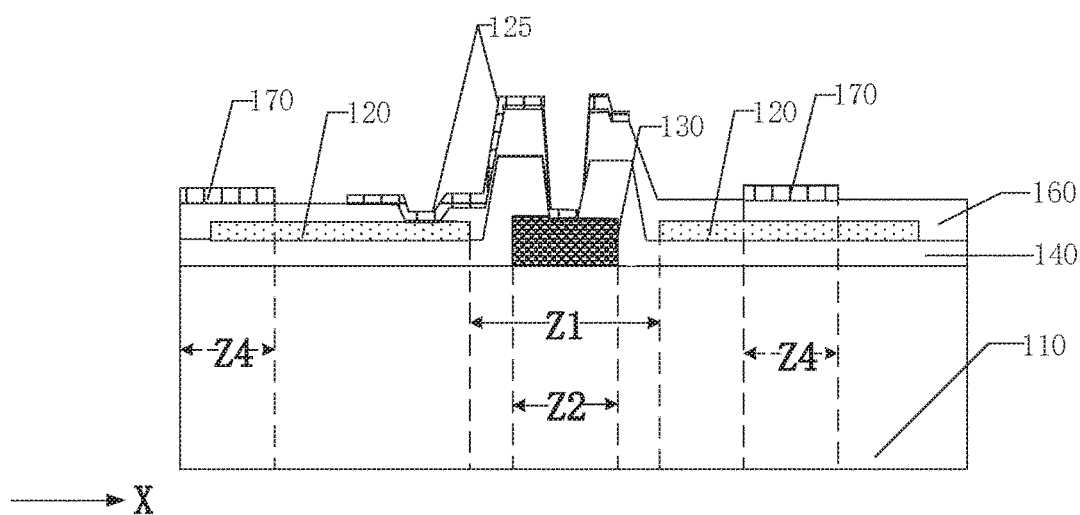
FIG. 2B is a schematic cross-sectional view of the touch array substrate along a line A-A' in FIG. 2A.

FIG. 2B is a schematic cross-sectional view of the touch array substrate along a line A-A' in FIG. 2A. As shown in FIG. 2B, the touch sensing electrode layer may be directly disposed on the substrate 110, which may be made of glass or transparent material.

The touch sensing electrode 120 is configured to sense a position of a user touch, and each touch sensing electrode line 130 is electrically connected with one of the touch sensing electrodes 120 by a bridge 125 and is configured to apply an electric driving signal to the touch sensing electrode 120 so that the position of the user touch can be sensed by the touch sensing electrode 120.

With reference to both FIGS. 2A and 2B, the touch sensing electrode 120 includes a first slot 121, a projection of the first slot 121 onto the substrate 110 in a direction perpendicular to the substrate 110 is represented as a first region Z1, and a projection of the touch sensing electrode line 130 onto the substrate 110 in the direction perpendicular to the substrate 110 is represented as a second region Z2, where the first region Z1 is at least partially overlapped with the second region Z2, i.e. the first slot 121 in the touch sensing electrode 120 and the touch sensing electrode line 130 are located in different layers and overlap with one another in the direction perpendicular to the substrate 110, to reduce an area of the touch sensing electrode line 130 that faces the touch sensing electrode 120, so that parasitic capacitance between the touch sensing electrode line 130 and the touch sensing electrode 120 is decreased. Because the parasitic capacitance between the touch sensing electrode line and the touch sensing electrode is proportional to the area of the touch sensing electrode line that faces the touch sensing electrode, thereby reducing a load between the touch sensing electrode line 130 and the touch sensing electrode 120.

In order to further reduce the surface area of a portion of the touch sensing electrode 120 overlapped with the touch sensing electrode line 130 so as to reduce the load between the touch sensing electrode line 130 and the touch sensing electrode 120, the first slot 121 has a width larger than that of the touch sensing electrode line 130. Optionally, the first slot 121 has a width equal to that of the touch sensing electrode line 130.

As shown in FIG. 2B, the touch array substrate further includes pixel electrodes 170, a projection of the pixel electrode 170 in the direction perpendicular to the substrate 110 is represented as a fourth region Z4 separated from the first region Z1, i.e. the projection of the first slot 121 in a direction perpendicular to a plane where the pixel electrodes 170 are located does not overlap the pixel electrodes 170 and is located outside of the pixel electrodes 170. Optionally, the projection of the first slot 121 in the direction perpendicular to the pixel electrodes 170 is located between two pixel electrodes 170 adjacent to each other along a first direction (represented as a direction X), where, the first direction is perpendicular to an extending direction of the touch sensing electrode line 130.

The bridge 125 includes a via structure and a conductive layer disposed at the same layer as the pixel electrode 170. A first insulation layer 140 is disposed between the touch sensing electrode line 130 and the touch sensing electrode 120, and a second insulation layer 160 is disposed between the touch sensing electrode 120 and the pixel electrode 170. The first insulation layer 140 and the second insulation layer 160 both can be made of silicon oxide or silicon nitride It is noted that the touch array substrate further includes a common electrode (not shown), so that an electric field is formed between the common electrode and the pixel electrode 170.

It is noted that the touch array substrate may be of a top-common electrode configuration in which the common electrode is above a layer where the pixel electrodes 170 are located, or may also be of a middle-common electrode configuration in which the pixel electrode 170 is above the layer where the common electrode is located.

With reference to both FIGS. 2A and 2B, in order to prevent the first slot 121 from running across the touch sensing electrode layer, the first slot 121 has a length less than that of the pixel electrode 170. For example, in the case that the pixel electrode 170 is a strip electrode including an intermediate part and an inclined end part, the first slot 121 has a length larger than that of the intermediate part.

It is noted that the disclosure does not limit the structure of the pixel electrode 170. For example, the pixel electrode 170 may be either a single-domain pixel electrode or a dual-domain pixel electrode.

Figure 2C:
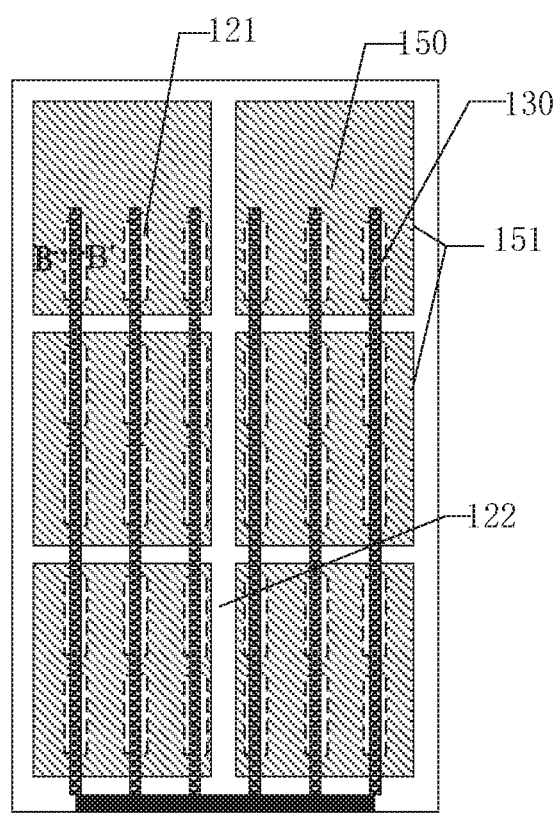
FIG. 2C is a schematic partial top view of a touch array substrate, according to embodiments of the disclosure.
Figure 2D:
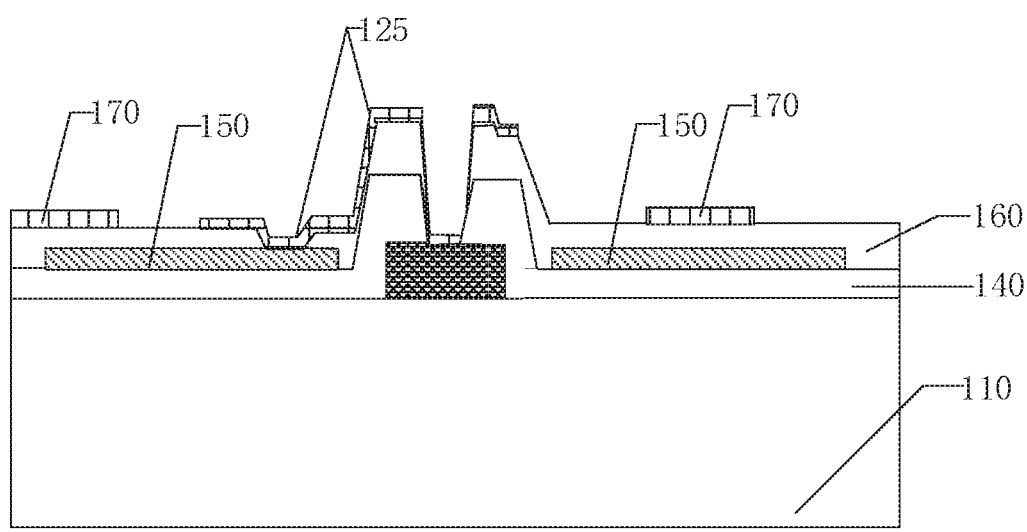
FIG. 2D is a schematic cross-sectional view of the touch array substrate along a line B-B' in FIG. 2C.

FIG. 2C is a schematic partial top view of a touch array substrate, according to embodiments of the disclosure, and FIG. 2D is a schematic cross-sectional view of the touch array substrate along a line B-B' in FIG. 2C. As shown in FIG. 2C, the touch array substrate includes a substrate and a common electrode layer 151, where, the common electrode layer 151 is divided into a plurality of touch sensing electrode blocks 150 which are insulated from each other by a third slot 122, and each of the touch sensing electrode blocks 150 is electrically connected with one touch sensing electrode line 130 and configured to apply an electric driving signal to the touch sensing electrode block 150 so that the position of the user touch can be sensed by the touch sensing electrode block 150, i.e. the common electrode layer 151 is the same as the touch sensing electrode layer in the touch array substrate, and the touch sensing electrode is obtained simultaneously when manufacturing the common electrode without additional manufacture process, thereby decreasing the manufacture cost of the touch array substrate and thickness of the touch array substrate.

The touch array substrate may be a substrate comprised of a TFT array, where the TFT is used as a switch element. The substrate 110 may be made of glass or transparent material.

With reference to both FIGS. 2C and 2D, the touch sensing electrode block 150 further includes a first slot 121, a projection of the first slot 121 onto the substrate 110 in a direction perpendicular to the substrate 110 is represented as a first region, and a projection of the touch sensing electrode line 130 onto the substrate 110 in the direction perpendicular to the substrate 110 is represented as a second region, where the first region is at least partially overlapped with the second region, i.e. the first slot 121 is overlapped with the touch sensing electrode lines 130 to reduce the surface area of a portion of the touch sensing electrode 120 overlapped with the touch sensing electrode line 130, thereby decreasing the parasitic capacitance between the touch sensing electrode line 130 and the touch sensing electrode 120 and reducing a load between the touch sensing electrode line 130 and the touch sensing electrode block 150.

A pixel unit where the first slot 121 is located is functioned as a first pixel unit, a pixel unit where the third slot 122 is located is functioned as a second pixel unit, and other pixel unit excluding the first pixel unit and the second pixel unit is functioned as a third pixel unit.

A fringe field is formed between the pixel electrode 170 of the first pixel unit and the touch sensing electrode block 150 of the first pixel unit by the first slot 121 to drive liquid crystal, thereby affecting light transmittance of the first pixel unit. Similarly, a fringe field is also formed in the second pixel unit by the third slot 122, thereby affecting the light transmittance of the second pixel unit. However, no fringe field is formed in the third pixel unit, in order to cause differences in the light transmittances of the first pixel unit, the second pixel unit and the third pixel unit, thereby decreasing the luminance of a liquid crystal display panel incorporating the touch array substrate.

Figure 2E:
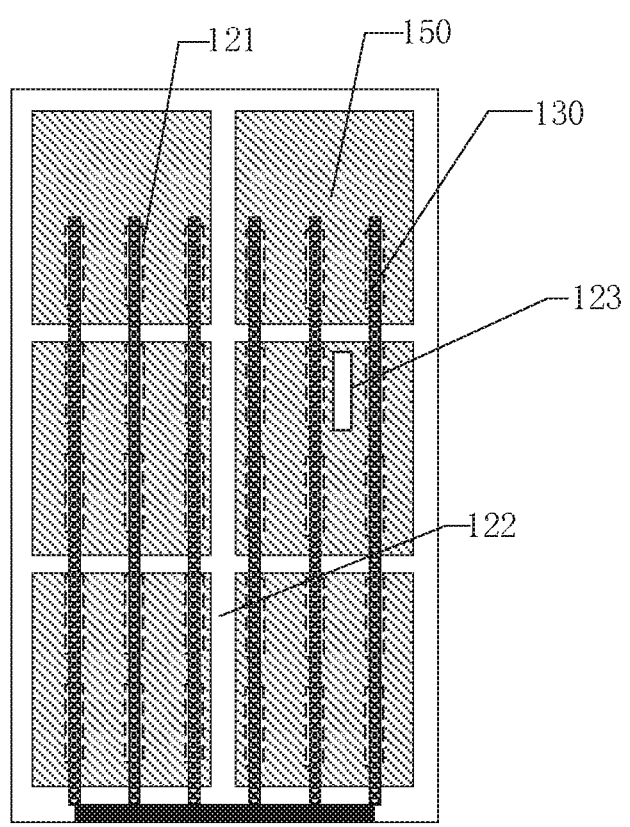
FIG. 2E is a schematic partial top view of a touch array substrate, according to embodiments of the disclosure.

FIG. 2E is a schematic partial top view of a touch array substrate, according to embodiments of the disclosure. As shown in FIG. 2E, in order to improve consistency of the light transmittances of the various pixel units so as to improve the luminance of the liquid crystal display panel, the touch sensing electrode block 150 further includes a second slot 123, and a projection of the second slot 123 in a direction perpendicular to the substrate is represented as a third region, which is separate from the second region. The third region does not overlap the second region and is located outside of the second region. A pixel unit where the second slot 123 is located is the third pixel unit.

Figure 5A:
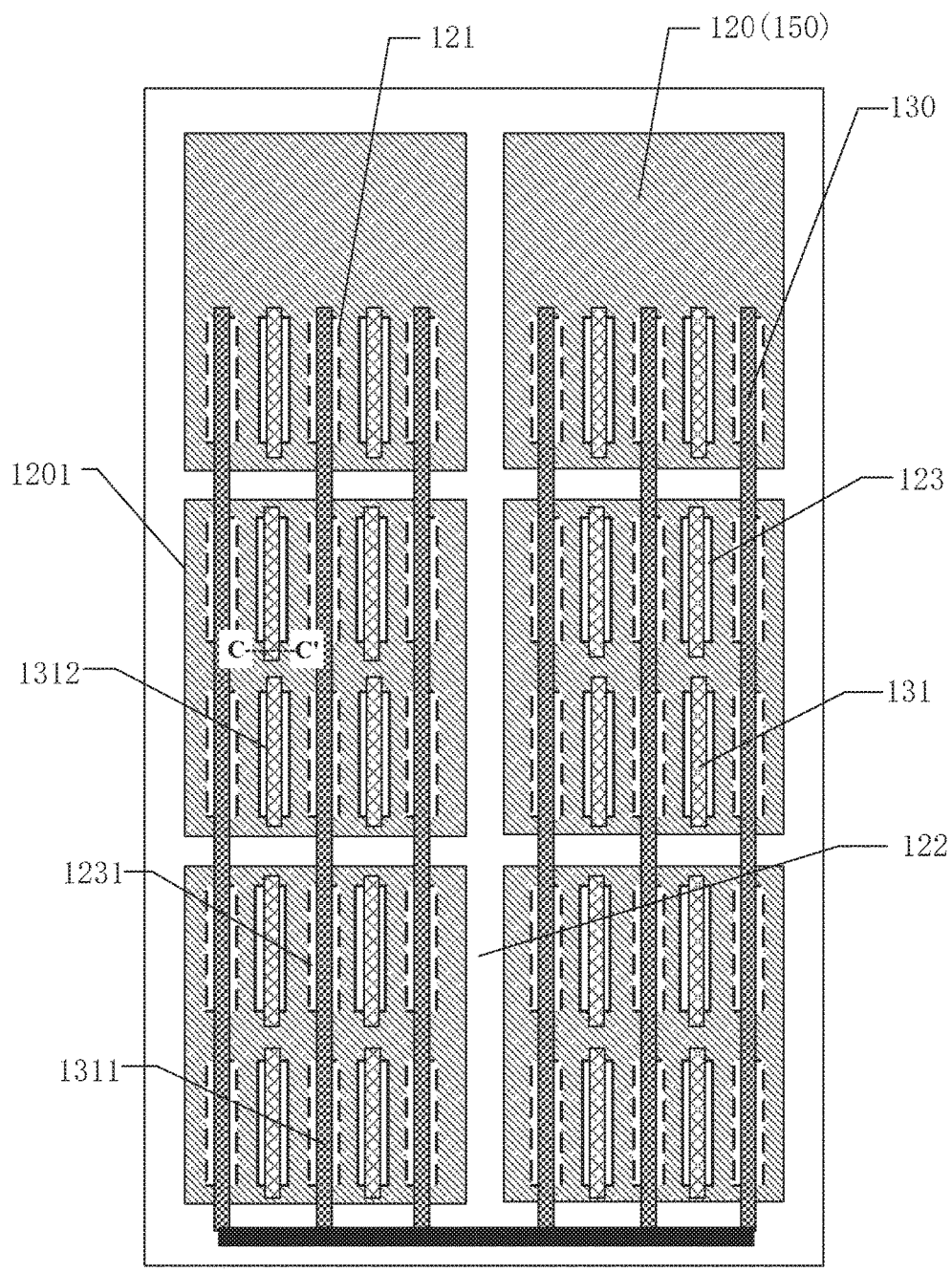
FIG. 5A is a schematic partial top view of a touch array substrate, according to embodiments of the disclosure.

FIG. 5A is a schematic partial top view of a touch array substrate, according to embodiments of the disclosure. As shown in FIG. 5A, based on the above embodiments, the touch array substrate provided further includes a touch sensing electrode line layer.

The touch sensing electrode line layer includes the plurality of touch sensing electrode lines 130 and a plurality of virtual touch sensing electrode lines 131. Projections of the touch sensing electrode lines 130 on the substrate in the direction perpendicular to the substrate are separated from projections of the virtual touch sensing electrode lines 131 on the substrate in the direction perpendicular to the substrate. Each of touch sensing electrodes 120 is respectively electrically connected with at least one of the touch sensing electrode lines 130. In some embodiments, the plurality of virtual touch sensing electrode lines 131 and the plurality of touch sensing electrode lines 130 may be formed by a same material. Optionally, the width of each of the virtual touch sensing electrode lines 131 may be less than or equal to that of each of the touch sensing electrode lines 130.

Figure 6A:
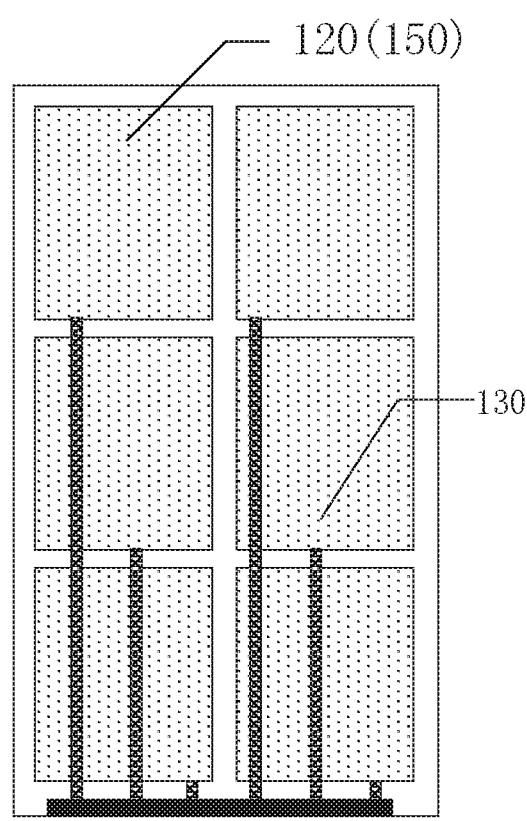
FIG. 6A is a schematic partial top view of a touch array substrate, according to embodiments of the disclosure.
Figure 6B:
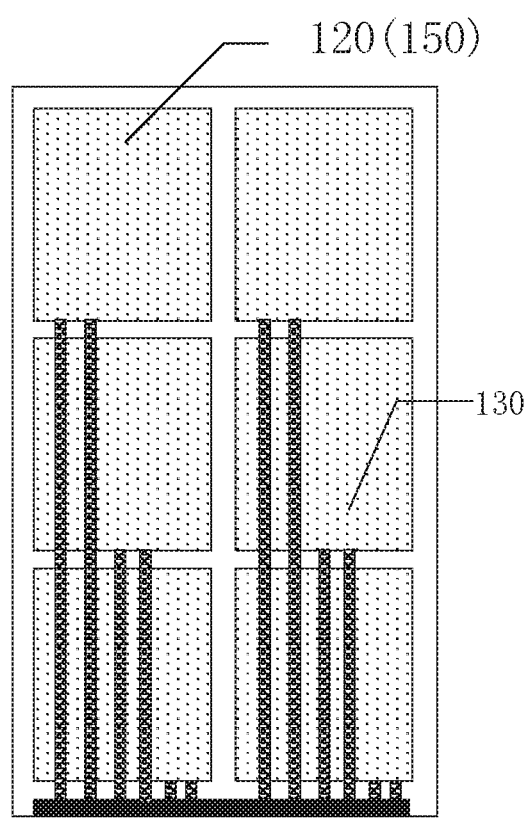
FIG. 6B is a schematic partial top view of a touch array substrate, according to embodiments of the disclosure.

For instance, as shown in FIG. 6A, each of the plurality of touch sensing electrodes 120 may be connected with one of the plurality of touch sensing electrode lines 130. In some embodiments, each of the plurality of touch sensing electrodes 120 may be connected with two (as shown in FIG. 6B) or more touch sensing electrode lines 130. In some embodiments, in a touch array substrate, the number of the touch sensing electrode lines 130 which are connected with a part of the touch sensing electrodes 120 may be different from that of the touch sensing electrode lines 130 which are connected with another part of of the touch sensing electrodes 120.

In some embodiments, at least one of the plurality of touch sensing electrodes 120 may include at least one first slot 121 and at least one second slot 123. In some embodiments, each of the plurality of touch sensing electrodes may include at least one first slot 121 and at least one second slot 123. A third region, which represents a projection of the at least one second slot 123 onto the substrate in the direction perpendicular to the substrate, is separated from a projection of each of the touch sensing electrode lines 130.

Figure 5B:
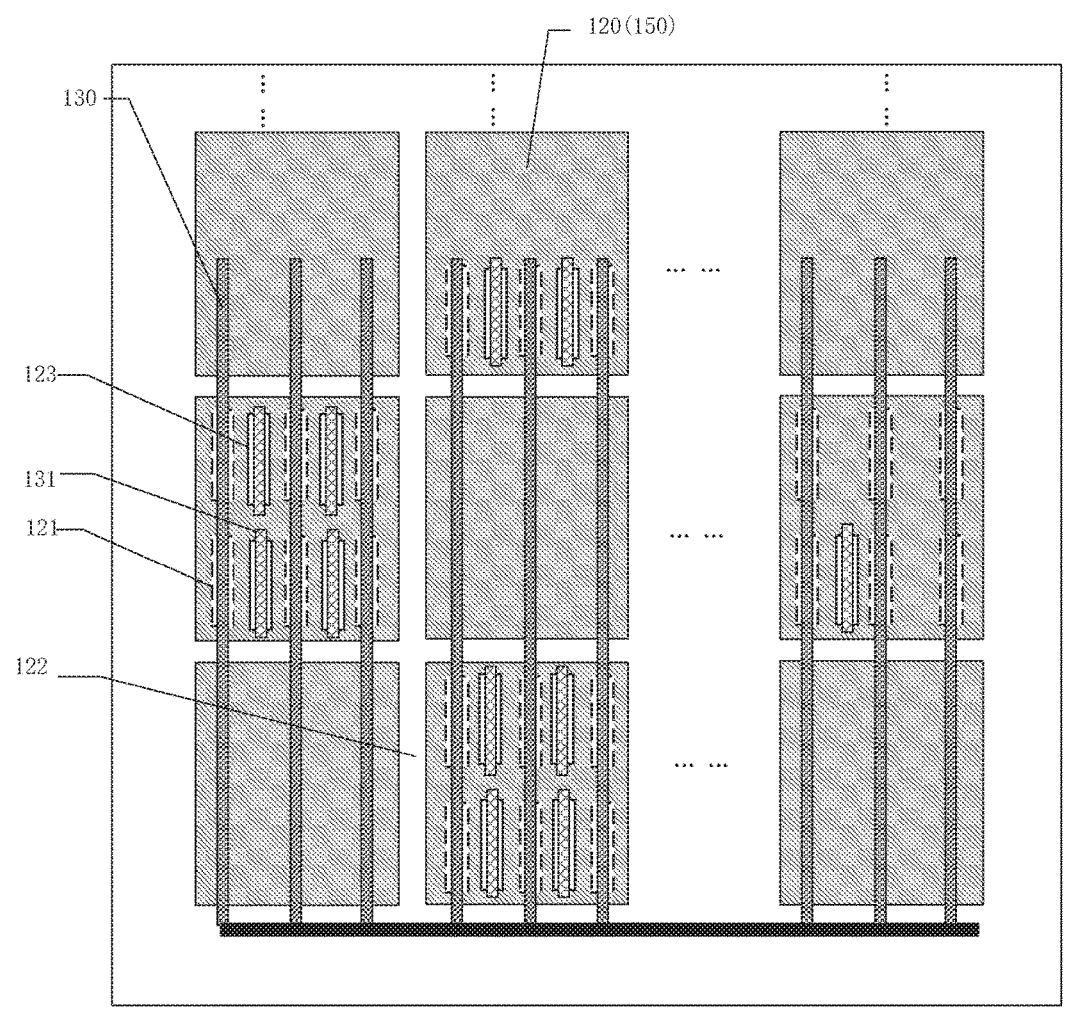
FIG. 5B is another schematic partial top view of a touch array substrate, according to embodiments of the disclosure.
Figure 5C:
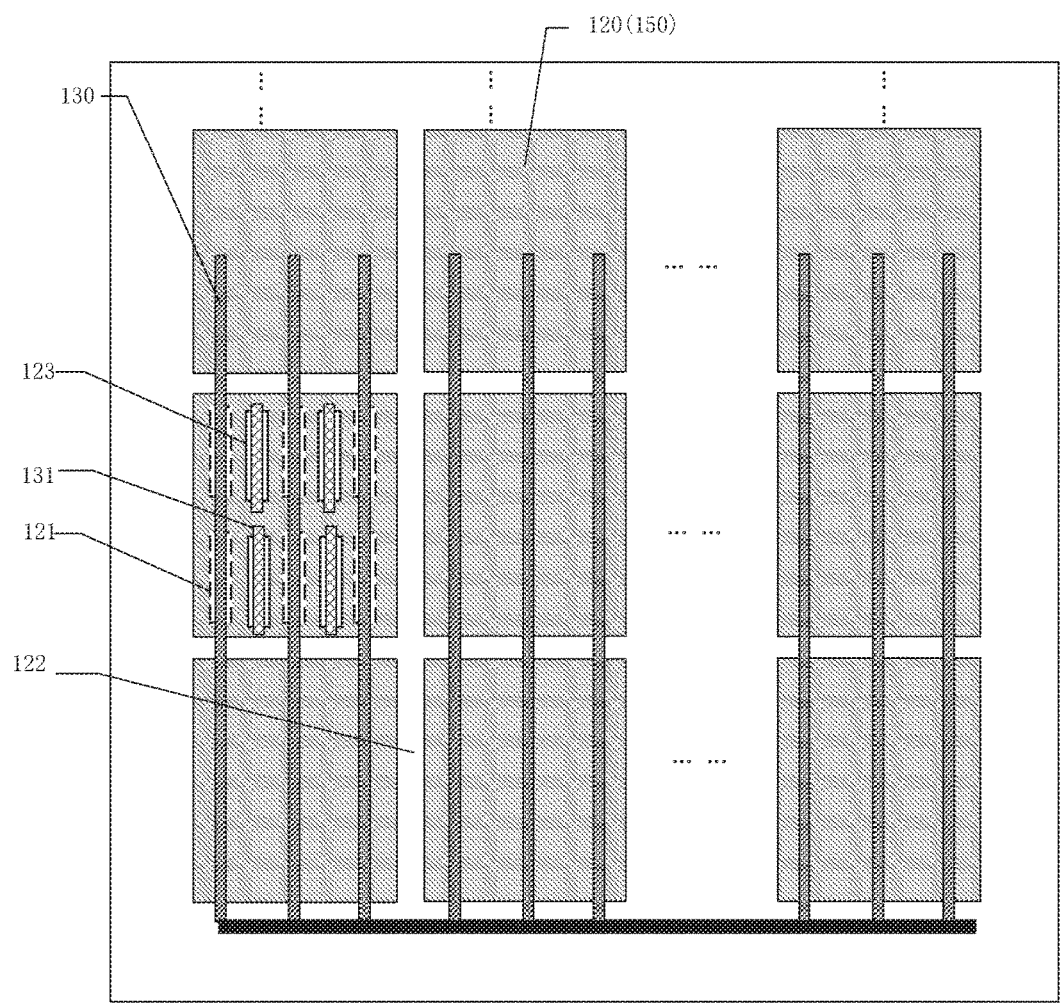
FIG. 5C is another schematic partial top view of a touch array substrate, according to embodiments of the disclosure.

Alternatively, there are various cases that the at least one of the touch sensing electrodes 120 includes at least one second slot 123. In one example, each of the plurality of touch sensing electrodes 120 includes at least one second slot 123 as shown in FIG. 5A. In another example, a part of the plurality of touch sensing electrodes 120 includes at least one second slot 123, and as shown in FIG. 5B, there may be 1, 2 or 4 second slots 123 in one touch sensing electrode 120. In another example, one of the plurality of touch sensing electrodes includes at least one second slot 123, and as shown in FIG. 5C, there is one touch sensing electrode 120 having 4 second slots 123 in it.

Alternatively, a projection of each of the at least one second slot 123 onto the substrate is at least partially overlapped with a projection of a respective one of the virtual touch sensing electrode lines 131 on the substrate in the direction perpendicular to the substrate, thereby improving consistency of the light transmittances of the various pixel units so as to improve the luminance of the liquid crystal display panel. For the second slots 123 and the virtual touch sensing electrode lines 131, there may be various cases as follows.

In one example, referring to FIG. 5A, there is a plurality of second slots 1231 in one of the touch sensing electrodes 120, each of the second slots 1231 has a one-to-one relationship to one of the virtual touch sensing electrode lines 1311, that is, the projection of each of the second slots 1231 on the substrate are at least partially overlapped with a projection of one of the virtual touch sensing electrode lines 1311 on the substrate in the direction perpendicular to the substrate.

Figure 5D:
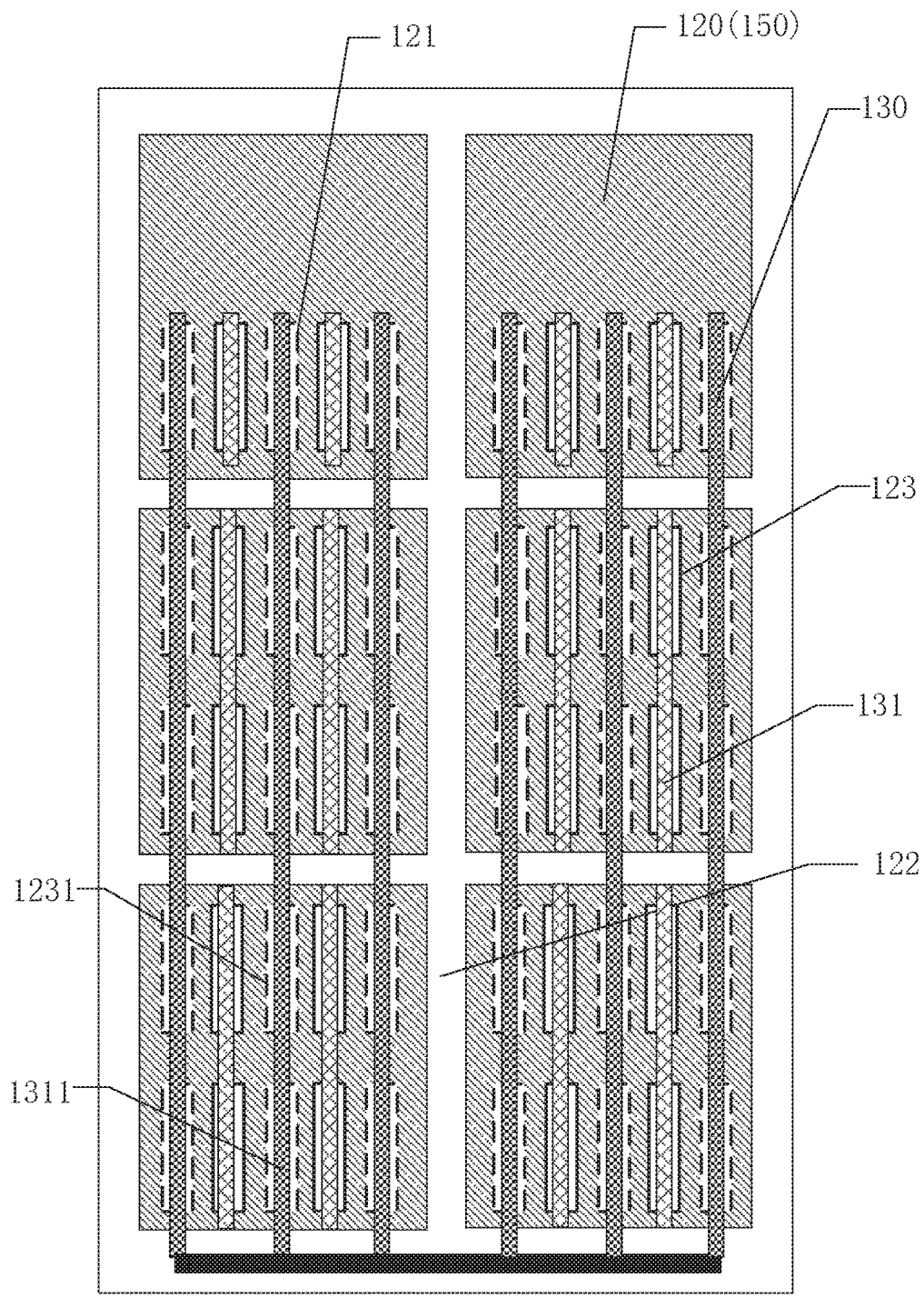
FIG. 5D is another schematic partial top view of a touch array substrate, according to embodiments of the disclosure.

In another example, referring to FIG. 5D, in one of the touch sensing electrodes 120, in one column, there may be two or more second slots 1231, and in the FIG. 5D, there are two second slots 1231 in each column. In one of the touch sensing electrodes 120, the two or more second slots 1231 in one column correspond to a same one of the virtual touch sensing electrode lines 1311, that is to say, all projections of the second slots 1231 in one column are at least partially overlapped with a projection of the same one of the virtual touch sensing electrode lines 1311.

In some embodiments, the plurality of virtual touch sensing electrode lines 131 may be disposed above or below the touch sensing electrodes 120.

Figure 5E:
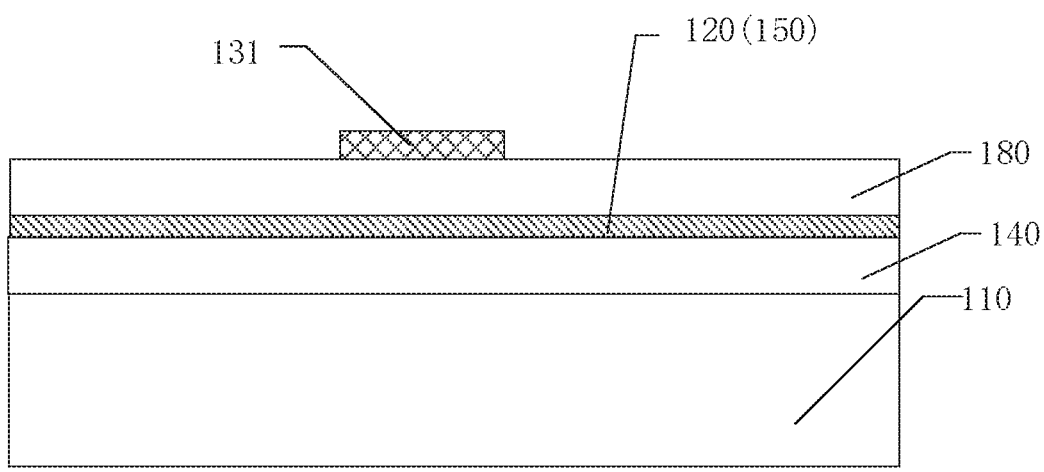
FIG. 5E is a schematic cross-sectional view of the touch array substrate along a line C-C' in FIG. 5A.

In some embodiments, the plurality of touch sensing electrodes 120 may be insulated from the plurality of virtual touch sensing electrode lines 131. For instance, a third insulation layer 180 may be provided between the plurality of touch sensing electrodes 120 and the plurality of virtual touch sensing electrode lines 131 as shown in FIG. 5E.

In some embodiments, as shown in FIG. 5A, the touch sensing electrodes 120 include a first touch sensing electrode 1201, and the plurality of virtual touch sensing electrode lines 131 include a plurality of first virtual touch sensing electrode lines 1312. A projection of the first touch sensing electrode 1201 on the substrate 110 overlaps with projections of the plurality of the first virtual touch sensing electrode lines 1312 on the substrate 110; and the first touch sensing electrode 1201 is electrically connected with at least one of the first virtual touch sensing electrode lines 1312, thereby reducing the resistance of the touch electrodes 120 and thus improving the touch sensitivity of a display panel. And the first touch sensing electrode 1201 refers to at least one of the plurality of touch sensing electrodes 120.

Figure 5F:
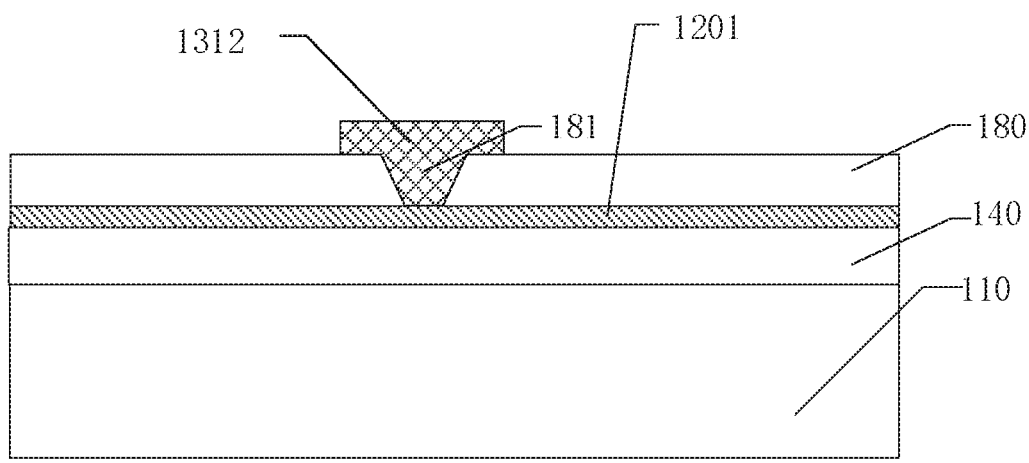
FIG. 5F is another schematic cross-sectional view of the touch array substrate along a line C-C' in FIG. 5A.

For instance, referring to FIG. 5F, a third insulation layer 180 is provided between the first touch sensing electrode 1201 and the first virtual touch sensing electrode lines 1312. At least one of the first virtual touch sensing electrode lines 1312 is electrically connected with the first touch sensing electrode 1201 through a through hole 181 disposed in the third insulating layer 180.

Figure 7:
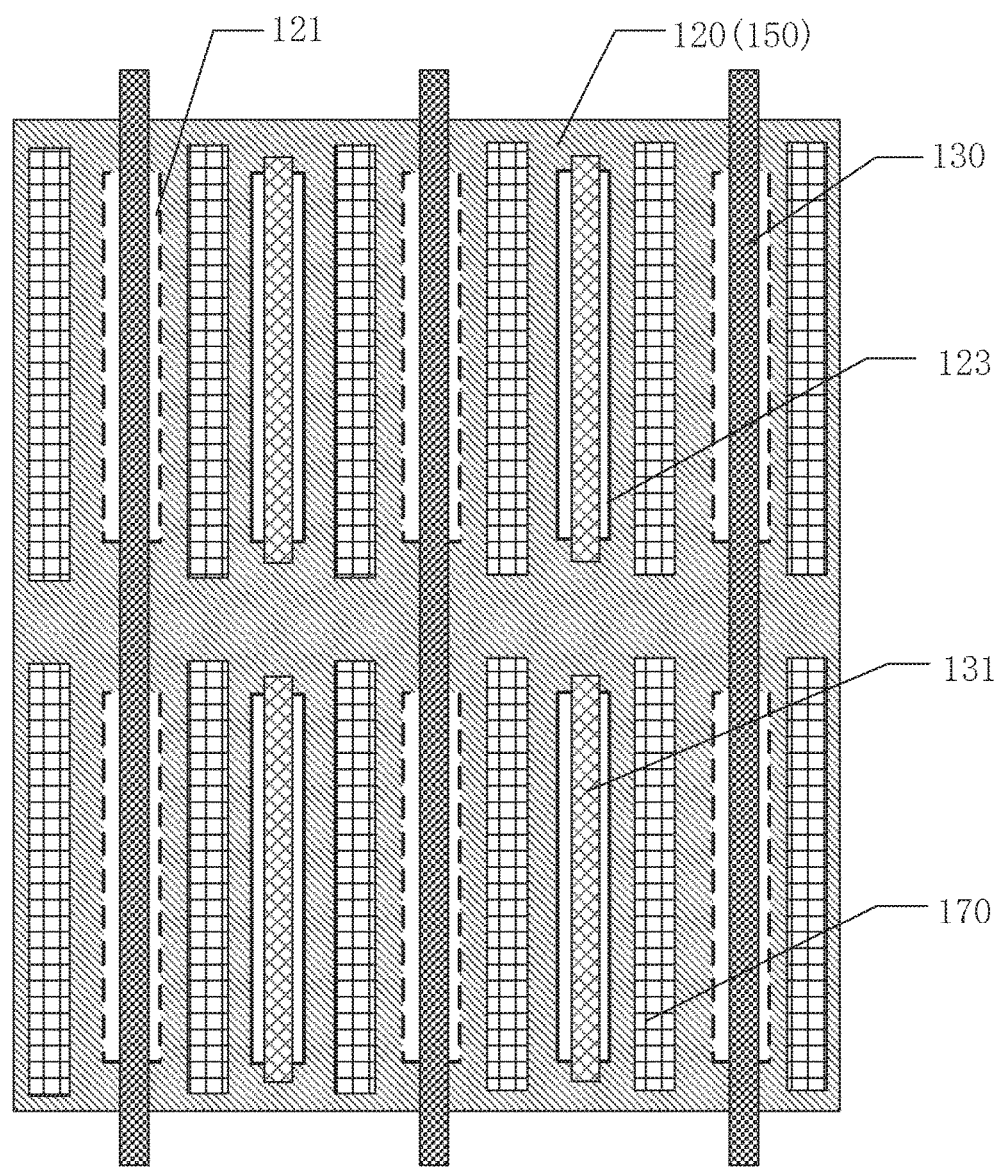
FIG. 7 is a schematic partial top view of a touch array substrate, according to embodiments of the disclosure.

FIG. 7 is a schematic partial top view of a touch array substrate, according to embodiments of the disclosure. Referring to FIG. 7, in one embodiment, a projection of the pixel electrodes 170 onto the substrate in the direction perpendicular to the substrate is separated from the first region, the third region and a projection of the plurality of virtual touch sensing electrode lines 131 on the substrate in the direction perpendicular to the substrate.

It is found in testing that the light transmittance of each of the first pixel unit, the second pixel unit and the third pixel unit is 5.1% A under a condition of a white picture, but under a condition of a grayscale picture, the light transmittance of the first pixel unit is 1.975%, the light transmittance of the second pixel unit is 1.925% and the light transmittance of the third pixel unit is 1.8%, that is, the transmittances of the first pixel unit, the second pixel unit and the third pixel unit differ from each other significantly in the case of a low or middle gray scale, thereby causing non-uniform luminance of the liquid crystal display panel.

In order to improve consistency of the light transmittances of the first pixel unit and the third pixel unit, the second slot 123 has a length less than or equal to that of the first slot 121, and/or the second slot 123 has a width less than or equal to that of the first slot 121. In particular, the second slot 123 has a length less than or equal to that of the first slot 121, or the second slot 123 has a width smaller than that of the first slot 121, or the second slot 123 has a length smaller than that of the first slot 121 and the second slot 123 has a width smaller than that of the first slot 121.

Optionally, the second slot 123 has a width of 2 μm to 3 μm.

The strip pixel electrode is illustrated below to illustrate the effect of the slots to the light transmittances of the pixel units.

Figure 2F:
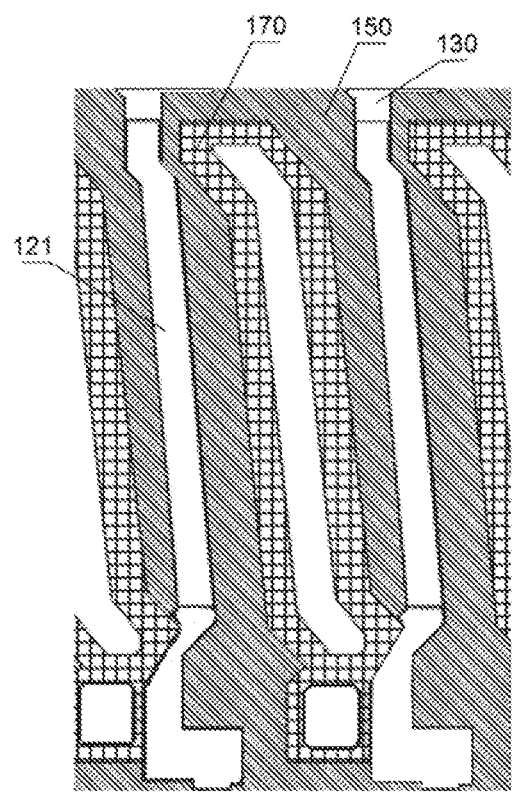
FIG. 2F is a schematic top view of the first pixel unit, according to embodiments of the disclosure.
Figure 2G:
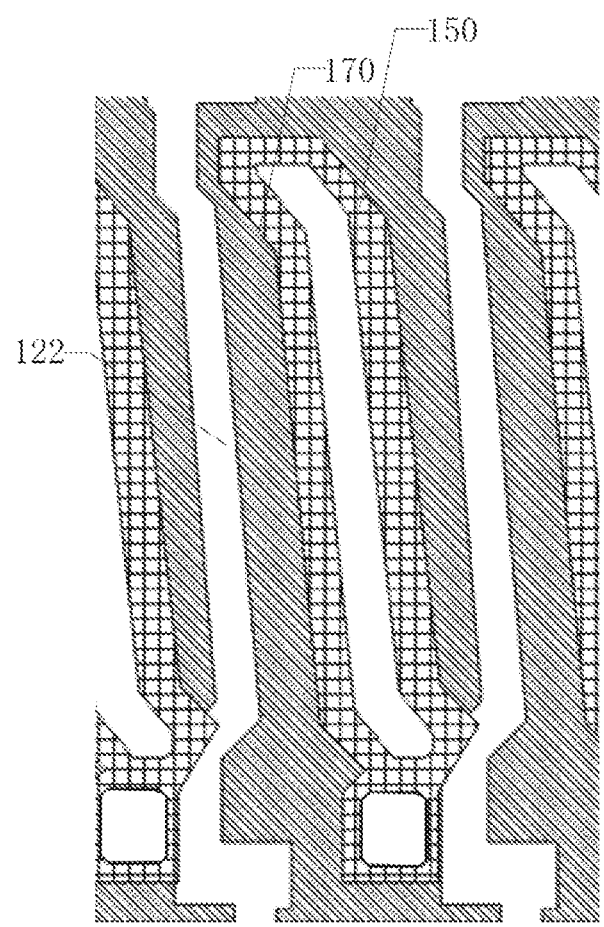
FIG. 2G is a schematic top view of the second pixel unit, according to embodiments of the disclosure.
Figure 2H:
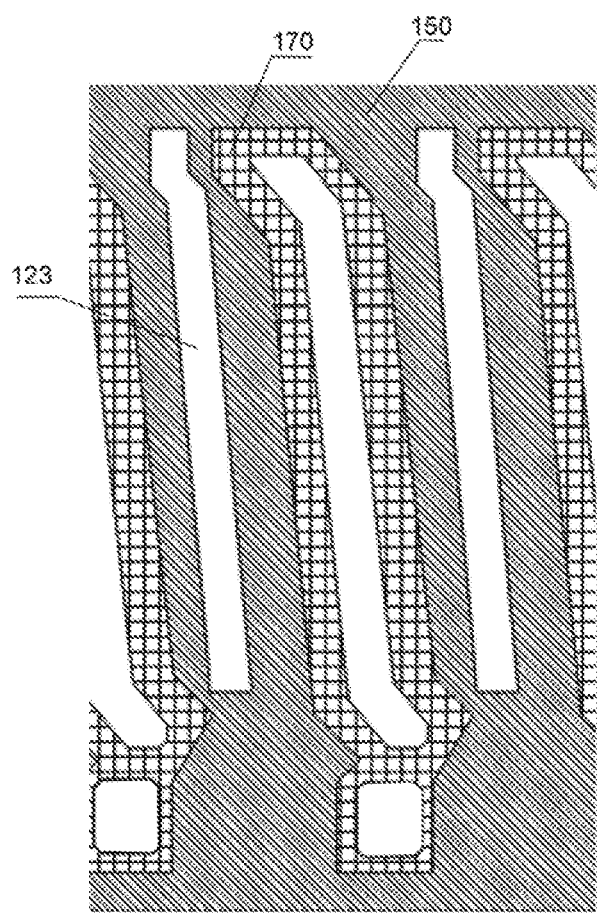
FIG. 2H is a schematic top view of the third pixel unit, according to embodiments of the disclosure.

FIG. 2F is a schematic top view of the first pixel unit, according to embodiments of the disclosure, FIG. 2G is a schematic top view of the second pixel unit, according to embodiments of the disclosure, and FIG. 2H is a schematic top view of the third pixel unit, according to embodiments of the disclosure. With reference to all FIGS. 2F to 2H, each of the pixel electrodes 170 includes at least one strip electrode, and the strip electrode includes an intermediate part and an inclined end part. The first slot 121 is overlapped with the touch sensing electrode line 130, the third slot 122 runs across the second pixel unit, and the second slot 123 is not overlapped with the touch sensing electrode line 130.

The first slot 121 has a width equal to that of the touch sensing electrode line 130, the first slot 121 has a length larger than that of the intermediate part and smaller than that of the strip electrode, and the third slot 122 runs across the second pixel unit, i.e. the third slot 122 has a length equal to or larger than that of the strip electrode.

It was found in testing that the light transmittances of the first pixel unit and the second pixel unit both are 1.975% under a condition of the grayscale picture, i.e. the light transmittances of the first pixel unit and the second pixel unit are identical, thereby improving consistency of the light transmittances of the first pixel unit and the second pixel unit in the case of a low or middle gray scale.

It was found in testing that, if the second slot 123 has a length equal to that of the third slot 122, the light transmittance of the third pixel unit is 1.775% in the case of a low or middle gray scale when the second slot 123 has a width of 3.5 μm, the light transmittance of the third pixel unit is 1.825% in the case of a low or middle gray scale when the second slot 123 has a width of 3 μm, and the light transmittance of the third pixel unit is 1.9% in the case of a low or middle gray scale when the second slot 123 has a width of 2.5 μm.

In the touch array substrate of the disclosure, the parasitic capacitance between the touch sensing electrode line 130 and the touch sensing electrode 120 overlapping the touch sensing electrode line 130 is reduced by means of the first slot 121 to reduce a load between the touch sensing electrode line 130 and the touch sensing electrode 120, and the common electrode block is reused as the touch sensing electrode 120 to decrease the thickness of the touch array substrate and a manufacture cost of the touch array substrate. Additionally, the consistency of the light transmittance of the liquid crystal display panel including the array substrate 110 is improved by the first slot 121 and the second slot 123, thereby improving the luminance of the liquid crystal display panel.

Figure 3:
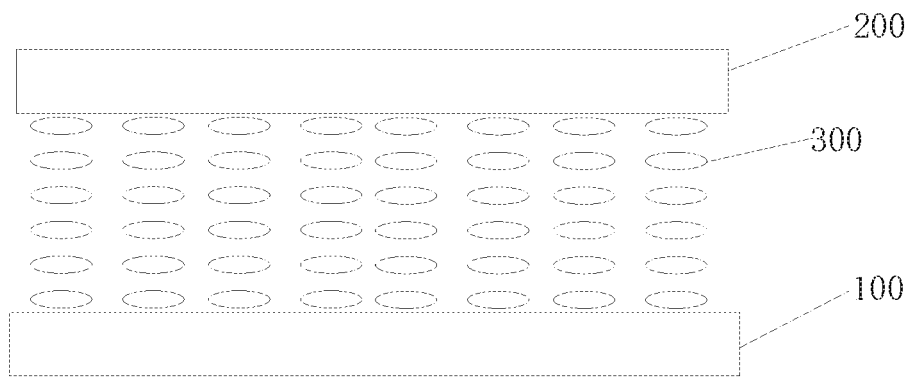
FIG. 3 is a schematic cross-sectional view of a liquid crystal display panel, according to embodiments of the disclosure.

FIG. 3 is a schematic cross-sectional view of a liquid crystal display panel, according to embodiments of the disclosure. As shown in FIG. 3, the disclosure provides a liquid crystal display panel, which includes a color filter substrate 200 and the array substrate 100 illustrated in any of the embodiments of the disclosure, where, a liquid crystal layer 300 is disposed between the color filter substrate 200 and the array substrate 100.

Figure 4:
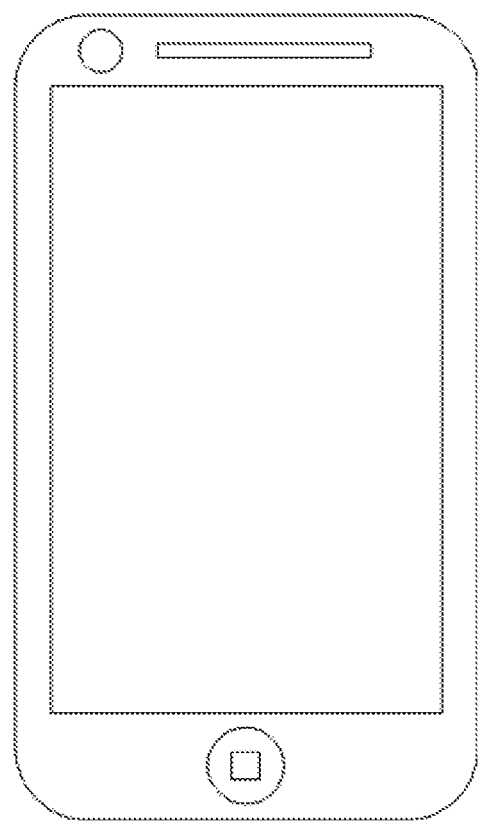
FIG. 4 is a schematic top view of a liquid crystal display device, according to embodiments of the disclosure.

FIG. 4 is a schematic top view of a liquid crystal display device, according to embodiments of the disclosure. As shown in FIG. 4, the disclosure provides a liquid crystal display device, including the liquid crystal display panel in any of the embodiments of the disclosure.

It should be noted that the above description describes embodiments and technical principles of the disclosure. Those skilled in the art will understand that the disclosure is not limited to the specific embodiments described herein, and various apparent changes, rearrangements and substitutions may be made without departing from the protecting scope of the disclosure. Therefore, although the disclosure has been described in detail as above in connection with the embodiments, the disclosure is not limited thereto and may include other embodiments without departing from the scope of the disclosure Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A touch array substrate, comprising:
   a substrate;
   a touch sensing electrode layer comprising a plurality of touch sensing electrodes insulated from each other; and
   a touch sensing electrode line layer comprising a plurality of touch sensing electrode lines and a plurality of virtual touch sensing electrode lines;
   wherein projections of the plurality of touch sensing electrode lines on the substrate in a direction perpendicular to the substrate are separated from projections of the plurality of virtual touch sensing electrode lines on the substrate in the direction perpendicular to the substrate;
   wherein each of the plurality of touch sensing electrodes is electrically connected with at least one of the plurality of touch sensing electrode lines; wherein at least one of the plurality of the touch sensing electrodes comprises a first slot and a second slot;
   wherein a first region, which represents a projection of the first slot on the substrate in the direction perpendicular to the substrate, is at least partially overlapped with a second region which represents a projection of the respective one of the plurality of touch sensing electrode lines on the substrate in the direction perpendicular to the substrate;
   wherein a third region, which represents a projection of the second slot on the substrate in the direction perpendicular to the substrate is separated from a projection of each of the plurality of touch sensing electrode lines on the substrate in the direction perpendicular to the substrate; and
   wherein the third region is at least partially overlapped with a projection of a respective one of the plurality of virtual touch sensing electrode lines on the substrate in the direction perpendicular to the substrate.

2. The touch array substrate of claim 1, wherein the plurality of touch sensing electrodes are insulated from the plurality of virtual touch sensing electrode lines.

3. The touch array substrate of claim 1, wherein the plurality of touch sensing electrodes comprise a first touch sensing electrode, the plurality of virtual touch sensing electrode lines comprise a plurality of first virtual touch sensing electrode lines, a projection of the first touch sensing electrode on the substrate overlaps with projections of the plurality of the first virtual touch sensing electrode lines on the substrate, and the first touch sensing electrode is electrically connected with at least one of the plurality of first virtual touch sensing electrode lines.

4. The touch array substrate of claim 3, wherein the first touch sensing electrode is electrically connected with at least one of the plurality of first virtual touch sensing electrode lines by a through hole.

5. The touch array substrate of claim 1, wherein the touch sensing electrode layer is a common electrode layer, and the common electrode layer is divided into the plurality of touch sensing electrodes by at least one third slot, and each of the plurality of the touch sensing electrodes comprises the first slot and the second slot.

6. The touch array substrate of claim 1, further comprising pixel electrodes, wherein a fourth region, which represents a projection of the pixel electrodes on the substrate in the direction perpendicular to the substrate is separated from the first region, the third region, and a projection of the plurality of virtual touch sensing electrode lines on the substrate in the direction perpendicular to the substrate.

7. The touch array substrate of claim 6, wherein, the first slot has a length smaller than that of the pixel electrode.

8. The touch array substrate of claim 1, wherein, the first slot has a width larger than or equal to that of the respective one of the plurality of touch sensing electrode lines.

9. The touch array substrate of claim 1, wherein, the second slot has a length smaller than or equal to that of the first slot, and/or the second slot has a width smaller than that of the first slot.

10. The touch array substrate of claim 1, wherein, the second slot has a width of 2 µm to 3 µm.

11. A liquid crystal display panel, comprising: a color filter substrate, a touch array substrate disposed opposite to the color filter substrate, and a liquid crystal layer disposed between the color filter substrate and the touch array substrate, the touch array substrate, comprising:
    a substrate; and
    a touch sensing electrode layer comprising a plurality of touch sensing electrodes insulated from each other;
    a touch sensing electrode line layer comprising a plurality of touch sensing electrode lines and a plurality of virtual touch sensing electrode lines;
    wherein a projection of the plurality of touch sensing electrode lines on the substrate in a direction perpendicular to the substrate is separated from a projection of the plurality of virtual touch sensing electrode lines on the substrate in the direction perpendicular to the substrate;

wherein each of the plurality of touch sensing electrodes is electrically connected with at least one of the plurality of touch sensing electrode lines;

wherein at least one of the plurality of the touch sensing electrodes comprises a first slot and a second slot;

wherein a first region, which represents a projection of the first slot on the substrate in the direction perpendicular to the substrate, is at least partially overlapped with a second region which represents a projection of the respective one of the plurality of touch sensing electrode lines on the substrate in the direction perpendicular to the substrate;

wherein a third region which represents a projection of the second slot on the substrate in the direction perpendicular to the substrate is separated from a projection of each of the plurality of touch sensing electrode lines on the substrate in the direction perpendicular to the substrate; and wherein the third region is at least partially overlapped with a projection of the respective one of the plurality of virtual touch sensing electrode lines on the substrate in the direction perpendicular to the substrate.

12. A liquid crystal display device, comprising: a liquid crystal display panel, comprising: a color filter substrate, a touch array substrate disposed opposite to the color filter substrate, and a liquid crystal layer disposed between the color filter substrate and the touch array substrate, the touch array substrate, comprising:

a substrate; and a touch sensing electrode layer comprising a plurality of touch sensing electrodes insulated from each other;

a touch sensing electrode line layer comprising a plurality of touch sensing electrode lines and a plurality of virtual touch sensing electrode lines;

wherein a projection of the plurality of touch sensing electrode lines on the substrate in a direction perpendicular to the substrate is separated from a projection of the plurality of virtual touch sensing electrode lines on the substrate in the direction perpendicular to the substrate;

wherein each of the plurality of touch sensing electrodes is electrically connected with at least one of the plurality of touch sensing electrode lines;

wherein at least one of the plurality of the touch sensing electrodes comprises a first slot and a second slot;

wherein a first region, which represents a projection of the first slot on the substrate in the direction perpendicular to the substrate, is at least partially overlapped with a second region which represents a projection of the respective one of the plurality of touch sensing electrode lines on the substrate in the direction perpendicular to the substrate;

wherein a third region which represents a projection of the second slot on the substrate in the direction perpendicular to the substrate is separated from a projection of each of the plurality of touch sensing electrode lines on the substrate in the direction perpendicular to the substrate; and wherein the third region is at least partially overlapped with a projection of the respective one of the plurality of virtual touch sensing electrode lines on the substrate in the direction perpendicular to the substrate.

* * * * *